(12) United States Patent
Tin

(10) Patent No.: US 8,731,315 B2
(45) Date of Patent: May 20, 2014

(54) IMAGE COMPRESSION AND DECOMPRESSION FOR IMAGE MATTING

(75) Inventor: Siu-Kei Tin, Milpitas, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 173 days.

(21) Appl. No.: 13/230,702

(22) Filed: Sep. 12, 2011

(65) Prior Publication Data

US 2013/0064465 A1    Mar. 14, 2013

(51) Int. Cl.
*G06K 9/36* (2006.01)
*G06K 9/46* (2006.01)
*H04N 7/30* (2006.01)
*H04N 7/26* (2006.01)

(52) U.S. Cl.
CPC ..... *H04N 19/00818* (2013.01); *H04N 19/0026* (2013.01); *H04N 19/00842* (2013.01)
USPC .......................................... 382/248; 382/232

(58) Field of Classification Search
None
See application file for complete search history.

(56) References Cited

U.S. PATENT DOCUMENTS

| | | | |
|---|---|---|---|
| 7,636,128 B2 | 12/2009 | Sun et al. | |
| 7,676,081 B2 | 3/2010 | Blake et al. | |
| 7,912,324 B2 * | 3/2011 | Suino et al. | 382/302 |
| 2004/0179742 A1 * | 9/2004 | Li | 382/239 |
| 2007/0025622 A1 * | 2/2007 | Simard et al. | 382/232 |
| 2008/0050023 A1 * | 2/2008 | Feng et al. | 382/232 |
| 2008/0244002 A1 * | 10/2008 | Yano | 709/203 |
| 2009/0180699 A1 * | 7/2009 | Boliek et al. | 382/232 |
| 2010/0158376 A1 | 6/2010 | Klosterman et al. | |
| 2011/0064309 A1 * | 3/2011 | Sadasue et al. | 382/173 |
| 2011/0206286 A1 * | 8/2011 | Taketa et al. | 382/232 |

OTHER PUBLICATIONS

C Christopoulos, A Skodras, "The JPEG2000 still image coding system: an overview", IEEE Transactions on Consumer Electronics, 2000.*
C Doukas, I Maglogiannis, "Region of interest coding techniques for medical image compression", IEEE Engineering in Medicine and Biology, 2007.*
S Li, W Li, "Shape-adaptive discrete wavelet transforms for arbitrarily shaped visual object coding", IEEE Transactions on Circuits and Systems for Video Technology, 2000.*
Simard et al., "A Foreground/Background Separation Algorithm for Image Compression", Data Compression Conference, Mar. 2004.
Simard et al., "A Wavelet Coder for Masked Images", Data Compression Conference, 2001.

(Continued)

*Primary Examiner* — Li Liu
(74) *Attorney, Agent, or Firm* — Fitzpatrick, Cella, Harper & Scinto

(57) ABSTRACT

Encoding image data and mask information to be used for matte images and for image and video matting. Image data and mask information for pixels of the image data in a first representation domain are accessed. The mask information defines background pixels and foreground pixels. The image data in the first representation domain is transformed to a second representation domain. Mask information in the second representation domain is determined by using the mask information in the first representation domain. The image data in the second representation domain is masked by setting image data to zero for background pixels as defined by the determined mask information in the second representation domain. The masked image data in the second representation domain is encoded. Decoding the encoded image data by accessing the encoded image data, decoding the masked image data in the second representation domain, and transforming the masked image data in the second representation domain to the first representation domain to obtain the decoded image data.

34 Claims, 14 Drawing Sheets

(56) References Cited

OTHER PUBLICATIONS

"Matte (filmaking)", Wikipedia.org, Jul. 16, 2011, available at http://en.wikipedia.org/wiki/Matte_(filmmaking).

Chuang et al., "Video Matting of Complex Scenes", ACM Transactions on Graphics (TOG)—Proceedings of ACM SIGGRAPH 2002, vol. 12 Issue 3, Jul. 2002.

* cited by examiner

IMAGE COMPRESSION AND DECOMPRESSION FOR IMAGE MATTING

FIELD

The present disclosure relates to image and video matting, and, more particularly, relates to encoding and decoding data used for matte images and for image and video matting.

BACKGROUND

Matting is a technique used in photography and filmmaking to create visual effects by compositing a foreground image with a background image, by using a matte that masks the shape of the foreground image. In filmmaking, matting is typically performed by using a green screen (or blue screen) in a process commonly known as chroma keying or color difference matting.

FIG. 1 is a view for explaining the chroma keying matting technique. As shown in FIG. 1, a scene is arranged in which a principal subject is positioned in front of a background screen consisting of a single color, such as a green color (green screen), and an image of the scene is captured, the captured image being the foreground image. After capture, the foreground image is encoded in accordance with a typical coding standard, such as, for example, JPEG 2000 and the like. During the compositing process, the foreground image is decoded, and matte extraction is performed to extract a binary mask that separates the background pixels from the foreground pixels of the foreground image. An encoded background image is accessed and decoded, and the foreground image is composited (blended) with the decoded background image using the binary mask to form a composited image. The composited image is formed such that the background pixels of the decoded foreground image are replaced with corresponding pixels of the decoded background image.

Other matting techniques include rotoscoping, and matting techniques that use cues other than color difference, such as techniques that use cues from infrared or polarized light.

To minimize edge artifacts, high quality image data is typically used for matting. For example, video image data in a progressive, non-interlaced format is typically used, lossless (or slightly lossy) compression is typically used, raw image data (i.e., image data that is not color balanced or otherwise corrected or tone mapped) is typically used, and high-resolution image data (e.g., 4K format) is typically used.

SUMMARY

The inventor herein has observed that typical encoding techniques encode the background pixels of the foreground image even though the background pixels will eventually be replaced during compositing.

The inventor herein has also observed that encoding techniques that attempt to treat background pixels differently from foreground pixels, such as the ROI (region of interest) coding in the JPEG 2000 standard, typically encode the background pixels. Moreover, the inventor recognizes that in many applications, the precise separating boundary between the foreground and background pixels is needed. Such information is typically not included in the encoded foreground image. More specifically, in an ROI coding of the foreground image, a zero pixel can either correspond to a background pixel, or it can correspond to a foreground pixel that happens to be zero. Accordingly, information about the separating boundary is typically encoded separately. In typical cases where the boundary is an irregular shape, as opposed to a simple shape such as a rectangle or ellipse, this separately encoded separating boundary adds significantly to the total file size.

FIG. 2 is a workflow diagram for explaining encoding in a typical image encoding process. As shown in FIG. 2, in step S10, image data values for pixels of the image data are preprocessed. This step may include, for example, shifting to convert unsigned integer values into signed integer values. In step S11, a forward inter-component transform is applied. Such transform may include, for example, a color space transform. In step S12, a forward intra-component transform is applied to each component. Such transform may include, for example, a sparsifying transform such as a discrete wavelet transform. In step S13, quantization of transform coefficients is performed. The output of step S13 is a set of integer numbers (quantized coefficients). In step S14, the quantized coefficients are encoded. However, masking is not performed in the encoding process depicted in FIG. 2.

FIG. 3 is a workflow diagram for explaining the decoding according to a typical image decoding process In step S20 the encoded image is decoded to obtain decoded quantized coefficients. In step S21, dequantization is performed. In step S22, an inverse intra-component transform is applied to the coefficients obtained in step S21. In step S23, an inverse inter-component transform is applied to the image data obtained in step S22. In step S24, image data values undergo postprocessing in order to obtain the reconstructed image.

A typical image codec does not provide encoding and decoding of image data with an irregular boundary as defined by a mask, wherein image data corresponding to the background pixels is not encoded. Some codecs, such as JPEG 2000, provide extensions in addition to the normal encoding and decoding process to allow for region-of-interest (ROI) coding. For example, JPEG 2000 Part 1 provides a Maxshift method for ROI coding that does not require transmission of the ROI mask to the decoder. However, the mask cannot be precisely recovered by the decoder due to ambiguity of zero valued foreground pixels and background pixels. JPEG 2000 Part 2 extensions allow more flexible ROI coding, but at the expense of requiring the transmission of the ROI mask to the decoder, which adds to the total file size.

The disclosure herein provides encoding and decoding of image data with an irregular boundary as defined by a mask, wherein image data corresponding to the background pixels is not encoded.

According to an aspect of the disclosure herein, image data and mask information for pixels of the image data in a first representation domain are accessed. The mask information defines background pixels and foreground pixels. The image data in the first representation domain is transformed to a second representation domain. Mask information in the second representation domain is determined by using the mask information in the first representation domain. The image data in the second representation domain is masked by setting image data to zero for background pixels as defined by the determined mask information in the second representation domain. The masked image data in the second representation domain is encoded.

By virtue of the foregoing arrangement, the size of the encoded image data may be reduced, since image data corresponding to the background pixels are not encoded.

In an example embodiment described herein, the first representation domain is a spatial domain. The mask information defines foreground and background pixels separated by an irregular boundary, and the mask information is comprised of a binary mask. The binary mask is determined by segmentation of the image data in software or hardware inside a camera.

In another example embodiment described herein, the binary mask is determined by segmentation of the image data in compositing software.

In an example embodiment described herein, the image data is comprised of at least one component and in the masking, a masking transform is applied to the image data in a component following the setting-to-zero of the image data for the background pixels. The masking transform adjusts image data away from zero for foreground pixels, as defined by the determined mask information in the second representation domain.

By virtue of the foregoing arrangement, the mask information, which defines foreground and background pixels separated by an irregular boundary, can be encoded with the masked image data in the second representation domain. In other words, since image data is adjusted away from zero for foreground pixels, the mask information, which identifies the location of foreground pixels, can be determined from the location of pixels whose image data is not zero.

In an example embodiment described herein, the component in which the masking transform is applied is a component that is encoded at a highest spatial resolution. In an example embodiment, the component corresponds to a luminance component.

In another example embodiment described herein, the component in which the masking transform is applied is a component in which distortion is least perceptible to the human eye. In an example embodiment, the component corresponds to a chroma component, a red component or a blue component.

In an example embodiment described herein, the image data is RGB image data. In another example embodiment described herein, the image data is raw data captured by using a color filter array (CFA).

In an example embodiment described herein, the encoding includes a data compression.

In an example embodiment described herein, the masked image data in the second representation domain is encoded by an encoding that preserves a nonzero-ness of the data being encoded. In an example embodiment, the preserving nonzero-ness corresponds to preserving a most significant bit of image data for foreground pixels as defined by the determined mask information in the second representation domain.

According to another aspect of the disclosure herein, the encoded image data is decoded by accessing the encoded image data, decoding the masked image data in the second representation domain, and transforming the masked image data in the second representation domain to the first representation domain to obtain the decoded image data.

According to another aspect of the disclosure herein, the encoded image data is decoded by accessing the encoded image data, decoding the image data in the second representation domain, extracting the mask information in the second representation domain, applying an inverse masking transform to the image data in the second representation domain, wherein the inverse masking transform undoes the adjusting away from zero for foreground pixels as defined by the mask information in the second representation domain, transforming the image data in the second representation domain to the first representation domain to obtain the decoded image data, and recovering the mask information in the first representation domain from the mask information in the second representation domain.

In an example embodiment described herein, the mask information in the first representation domain includes matte information, and the decoded image data is composited with second image data by application of the matte information.

This brief summary has been provided so that the nature of this disclosure may be understood quickly. A more complete understanding can be obtained by reference to the following detailed description and to the attached drawings.

DETAILED DESCRIPTION

In the following example embodiments, there are described processes for using one or more data processing apparatuses to encode and decode image data to be used for matte images and for image and video matting. Data processing apparatuses may include digital still cameras, digital video cameras, personal digital assistants (PDA), mobile telephones, handheld devices, computers, computer processors, or the like.

Figure 1:
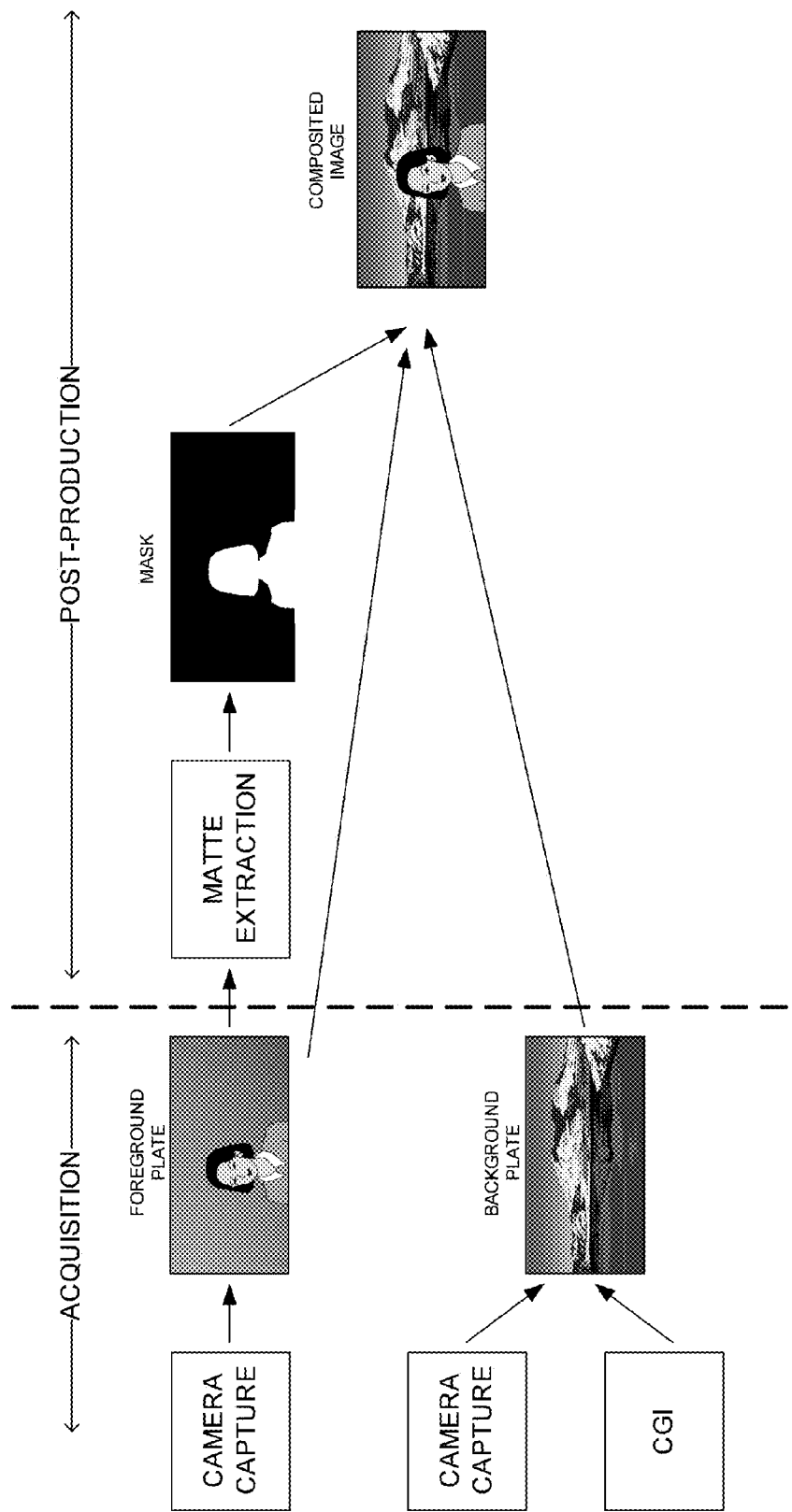
FIG. 1 is a view for explaining a chroma keying matting technique.
Figure 2:
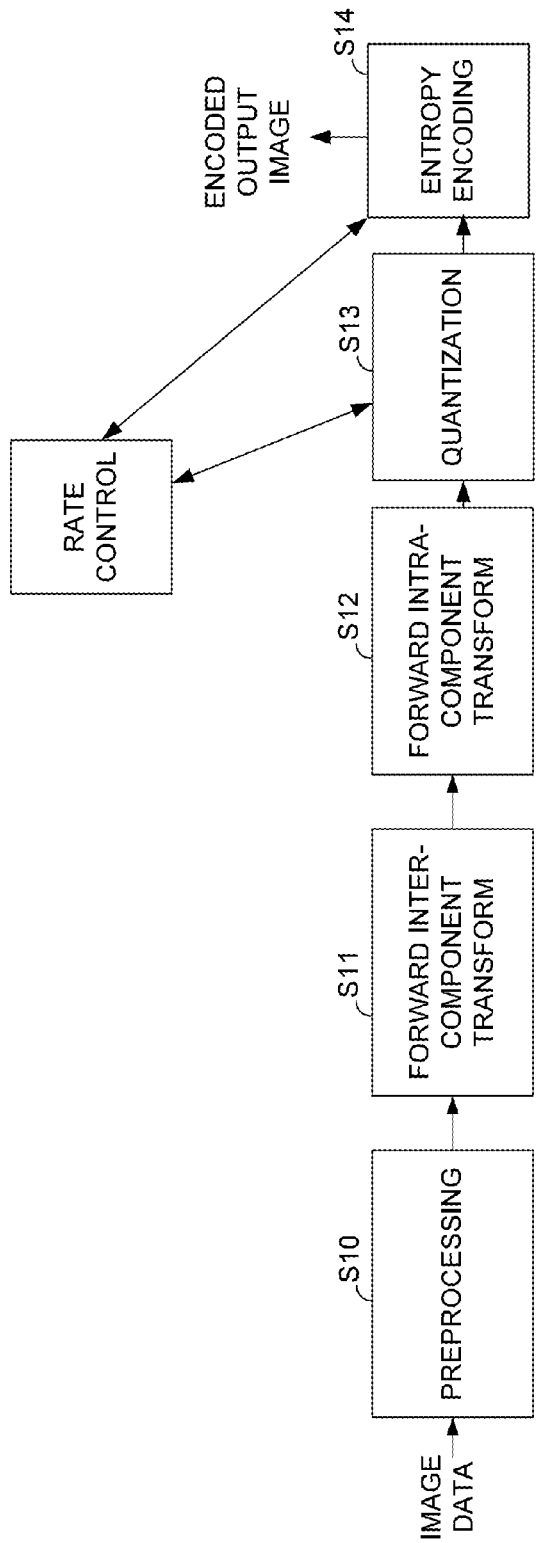
FIG. 2 is a workflow diagram for explaining a typical encoding process.
Figure 3:
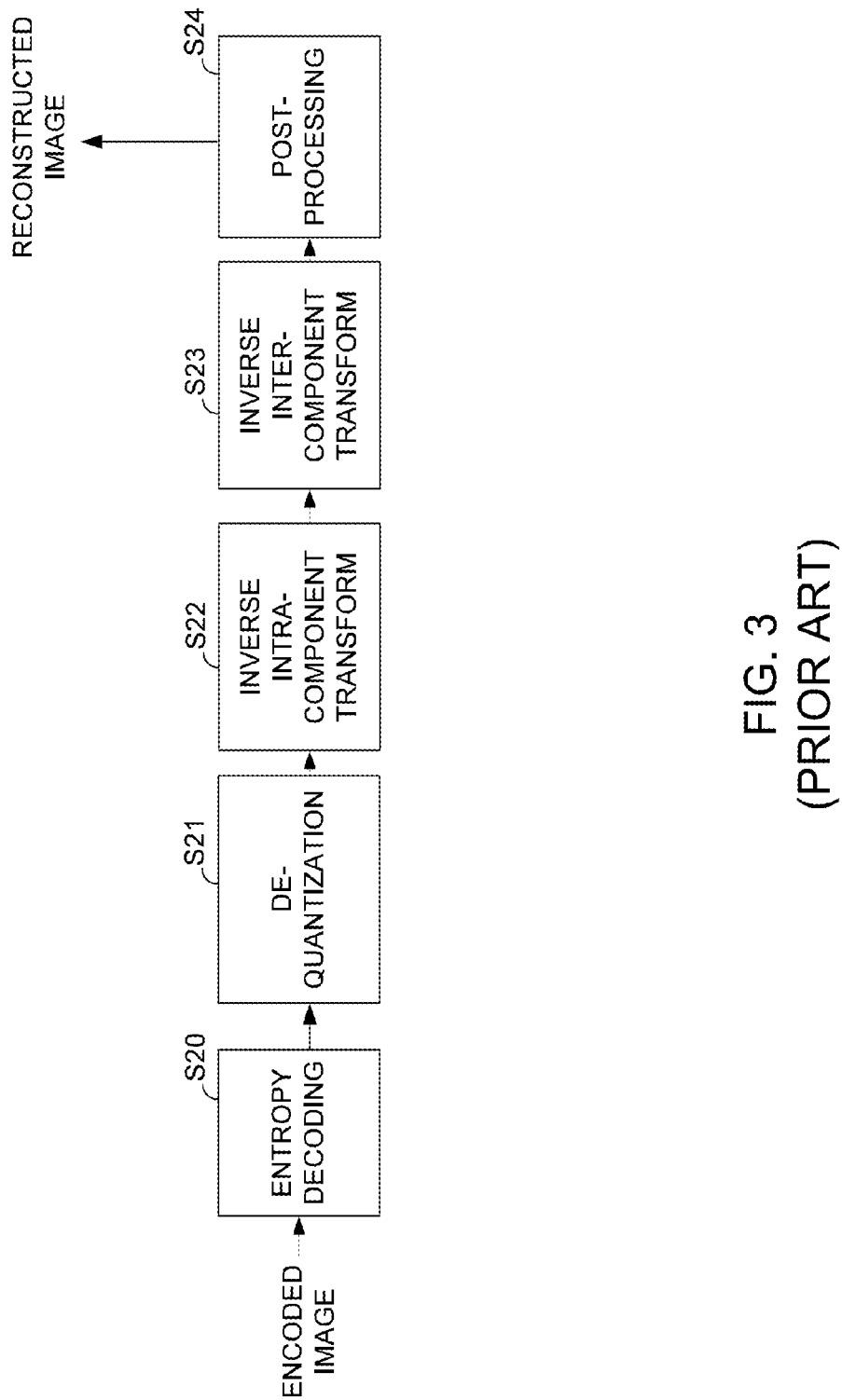
FIG. 3 is a workflow diagram for explaining a typical decoding process.
Figure 4:
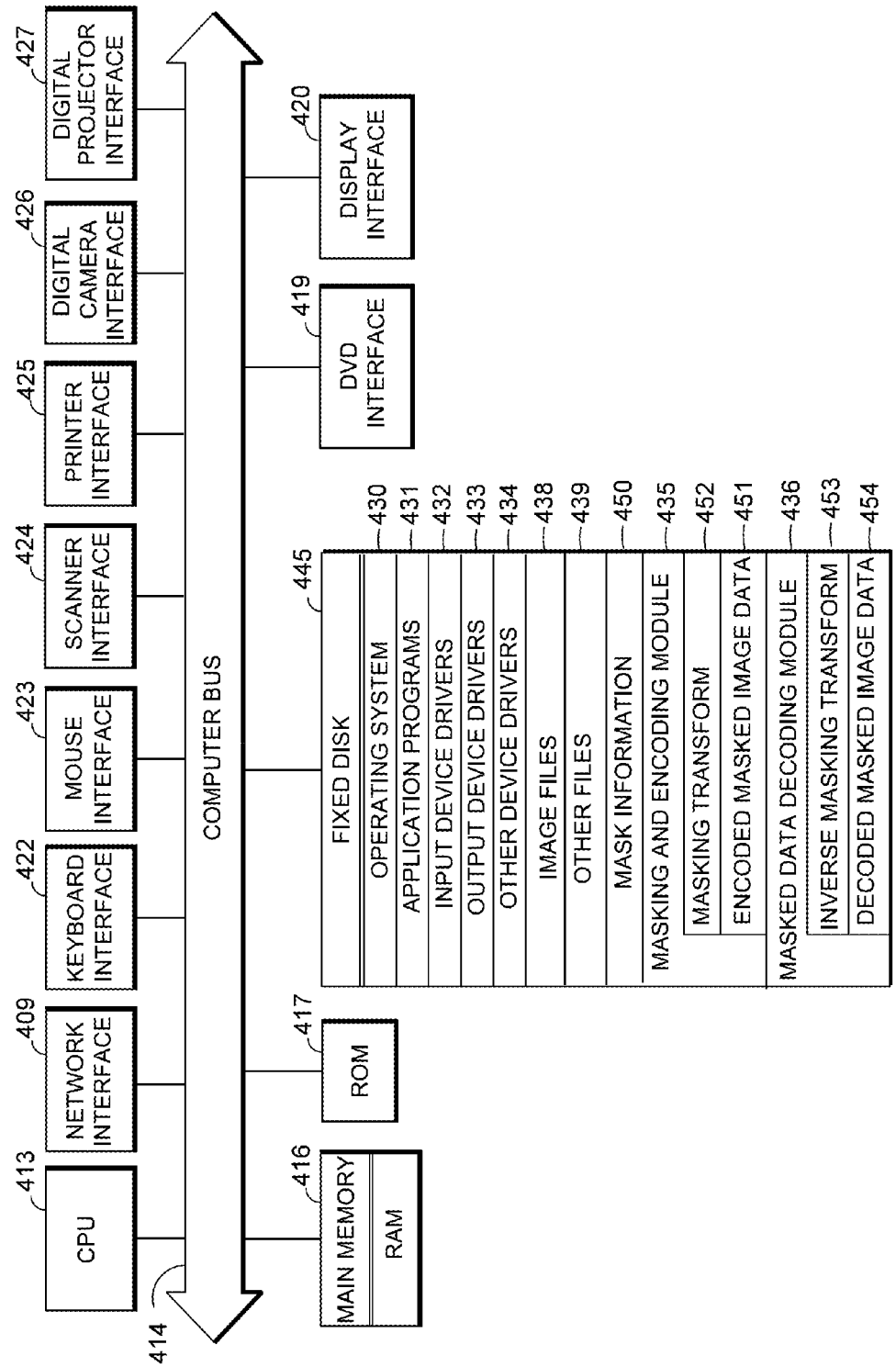
FIG. 4 is a detailed block diagram showing the internal architecture of a data processing apparatus according to an example embodiment.

FIG. 4 is a detailed block diagram showing the internal architecture of a data processing apparatus, such as a general purpose computing machine. In the example embodiment described with respect to FIG. 4, the data processing apparatus is programmed to perform processes described below with respect to FIGS. 7 to 14.

As shown in FIG. 4, the data processing apparatus includes central processing unit (CPU) 413 which interfaces with computer bus 414. Also interfacing with computer bus 414 are hard disk 445, network interface 409, random access memory (RAM) 416 for use as a main run-time transient memory, read only memory (ROM) 417, DVD disc interface 419, display interface 420 for a monitor (not shown), keyboard interface 422 for a keyboard (not shown), mouse interface 423 for a pointing device (not shown), scanner interface 424 for a scanner (not shown), printer interface 425 for a printer (not shown), digital camera interface 426 for a digital camera (not shown), and digital projector interface 427 for a digital projector (not shown).

RAM 416 interfaces with computer bus 414 so as to provide information stored in RAM 416 to CPU 413 during execution of the instructions in software programs such as an operating system, application programs, compositing software, and device drivers. More specifically, CPU 413 first loads computer-executable process steps (sometimes referred to as computer-executable instructions or computer-executable code) from fixed disk 445, or another storage device into a region of RAM 416. CPU 413 can then execute the stored process steps from RAM 416 in order to execute the loaded computer-executable process steps. Data such as image data, mask information or other information can be stored in RAM 416, so that the data can be accessed by CPU 413 during the execution of computer-executable software programs, to the extent that such software programs have a need to access and/or modify the data.

As also shown in FIG. 4, hard disk 445 contains computer-executable process steps for operating system 430, and application programs 431, such as word processing programs or compositing software. Hard disk 445 also contains computer-executable process steps for device drivers for software interface to devices, such as input device drivers 432, output device drivers 433, and other device drivers 434. Image files 438, including color image data, and other files 439 are available for output to color output devices and for manipulation by application programs.

Masking and encoding module 435 and masked data decoding module 436 generally comprise computer-executable process steps stored on a non-transitory computer-readable storage medium, e.g., hard disk 445, and executed by a computer. Examples of other non-transitory computer-readable storage medium include a fixed disk, a DVD, a CD ROM, a RAM, a flash drive, or the like.

The computer-executable process steps of masking and encoding module 435 are executed by a computer that encodes image data. Masking and encoding module 435 includes an accessing module, a transforming module, a determining module, a masking module and an encoding module. The accessing module is for accessing image data and mask information 450 for pixels of the image data in a first representation domain. The mask information 450 defines background pixels and foreground pixels. The transforming module includes a forward inter-component transform and a forward intra-component transform, and the transforming module transforms the image data in the first representation domain to a second representation domain. The determining module is for determining mask information in the second representation domain by using the mask information 450 in the first representation domain. The masking module includes the masking transform 452, and the masking module masks the image data in the second representation domain by setting image data to zero for background pixels as defined by the determined mask information in the second representation domain. The encoding module is for encoding the masked image data in the second representation domain. The output of the encoding module is encoded masked image data 451.

The process steps performed by masking and encoding module 435 will be described in more detail with respect to FIG. 7. With respect to FIG. 7, the accessing module performs steps S101 and S110, the transforming module performs steps S102, S103, S104, S105 and S109, the determining module performs step S111, the masking module performs step S106, and the encoding module performs steps S107 and S109.

The computer-executable process steps of masked data decoding module 436 are executed by a computer that decodes image data. Masked data decoding module 436 includes a masked data accessing module, a decoding module, an extracting module, an inverse masking transform module, a masked data transforming module, and a recovering module.

The masked data accessing module is for accessing image data 451 that is encoded by the masking and encoding module 435. The decoding module is for decoding the image data 451 in the second representation domain. The extracting module is for extracting the mask information in the second representation domain. The inverse masking transform module includes the inverse masking transform 453. The inverse masking transform module is for applying the inverse masking transform to the image data in the second representation domain, wherein the inverse masking transform undoes the adjusting away from zero for foreground pixels as defined by the mask information in the second representation domain. The masked data transforming module is for transforming the image data in the second representation domain to the first representation domain to obtain the decoded masked image data 454. The recovering module is for recovering the mask information 450 in the first representation domain from the mask information in the second representation domain.

The process steps performed by masked data decoding module 436 will be described in more detail with respect to FIG. 9. With respect to FIG. 9, the masked data accessing module performs step S301, the decoding module performs step S302, the extracting module and the inverse masking transform modules perform step S303, the masked data transforming module performs steps S304, S305, S306 and S307, and the recovering module performs step S308.

The computer-executable process steps for masking and encoding module 435 and masked data decoding module 436 may be configured as a part of operating system 430, as part of a device driver, or as a stand-alone application program such as compositing software. They may also be configured as a plug-in or dynamic link library (DLL) to the operating system, device driver or application program. For example, masking and encoding module 435 and masked data decoding module 436 according to example embodiments may be incorporated in a device driver for execution in a computing device, embedded in the firmware of a device, such as a camera, or provided in a stand-alone compositing application for use on a general purpose computer. In one example embodiment described herein, masking and encoding module 435 and masked data decoding module 436 are incorporated directly into the operating system for a general purpose host computer. It can be appreciated that the present disclosure is not limited to these embodiments and that the disclosed masking and encoding module and the disclosed masked data decoding module may be used in other environments in which masked image data is used.

Figure 5:
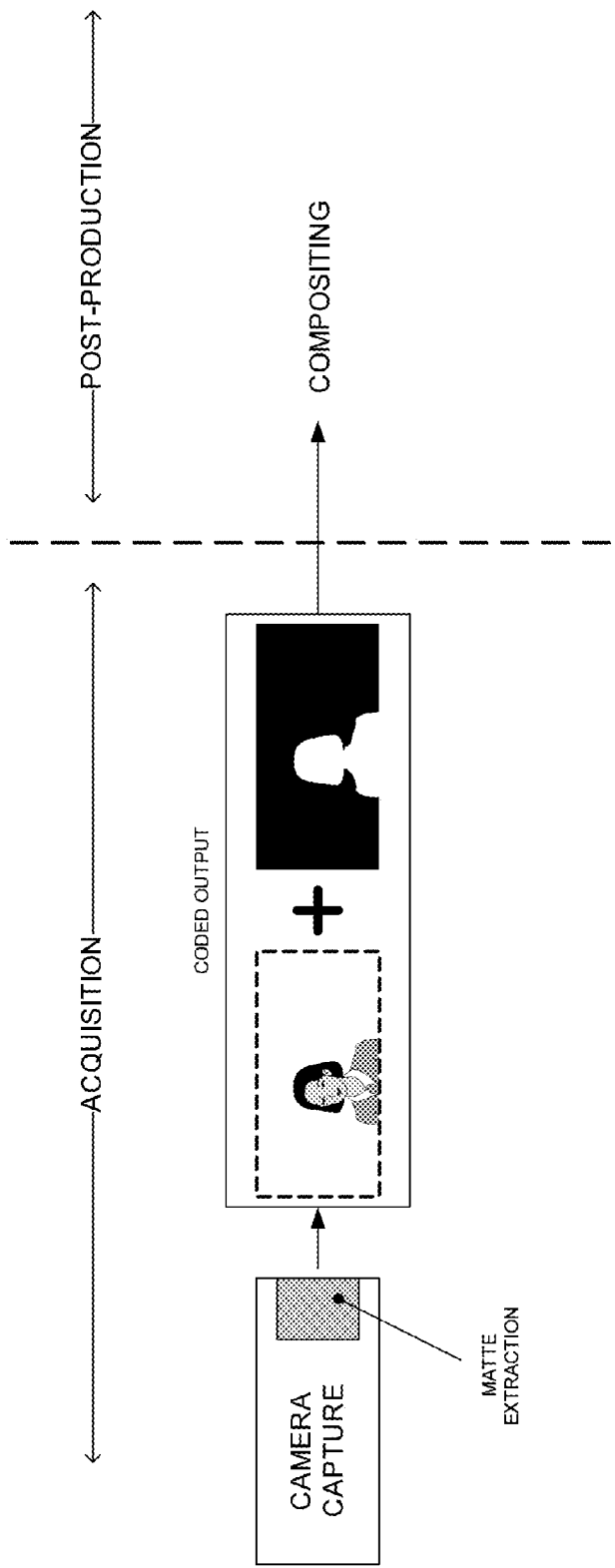
FIG. 5 is a view for explaining image data encoding according to an example embodiment.

FIG. 5 is a view for explaining image data encoding according to an example embodiment in which encoding of image data is performed during image acquisition by a data processing apparatus that is constructed to capture images, such as, for example, a digital still camera or a digital video camera. As shown in FIG. 5, during acquisition of a foreground image by a digital camera, the digital camera accesses image data and mask information for pixels of the image data in a first representation domain. In the example embodiment, the image data is RGB image data. The mask information is a binary mask that defines background pixels and foreground pixels separated by an irregular boundary. The binary mask is determined by segmentation of the image data in software or hardware inside the digital camera. The digital camera transforms the image data in the first representation domain to a second representation domain, and determines mask information in the second representation domain by using the mask information in the first representation domain. The digital camera masks the image data in the second representation domain by setting image data to zero for background pixels as defined by the determined mask information in the second representation domain. Finally, the digital camera encodes the masked image data in the second representation domain.

In the example embodiment, the encoding includes a data compression. The masked image data in the second representation domain is encoded by an encoding that preserves a nonzero-ness of the data being encoded. The preserving of the nonzero-ness involves preserving a most significant bit of image data for foreground pixels as defined by the determined mask information in the second representation domain.

The encoded masked image data in the second representation domain is outputted from the digital camera, and it is composited with other image data during post-production. In more detail, the encoded masked image data is decoded, and the mask information in the second representation domain is extracted. The mask information in the first representation domain is recovered from the mask information in the second representation domain. The mask information in the first representation domain comprises matte information, and the decoded masked image data is composited with second image data by application of the matte information.

In an example embodiment, the second representation domain is a sparsifying domain for the class of image data in question. For natural images, a sparsifying domain can be a frequency domain such as one that corresponds to the block discrete cosine transform used in the JPEG compression standard, or a wavelet domain such as one that corresponds to the discrete wavelet transform used in the JPEG 2000 compression standard.

Figure 6:
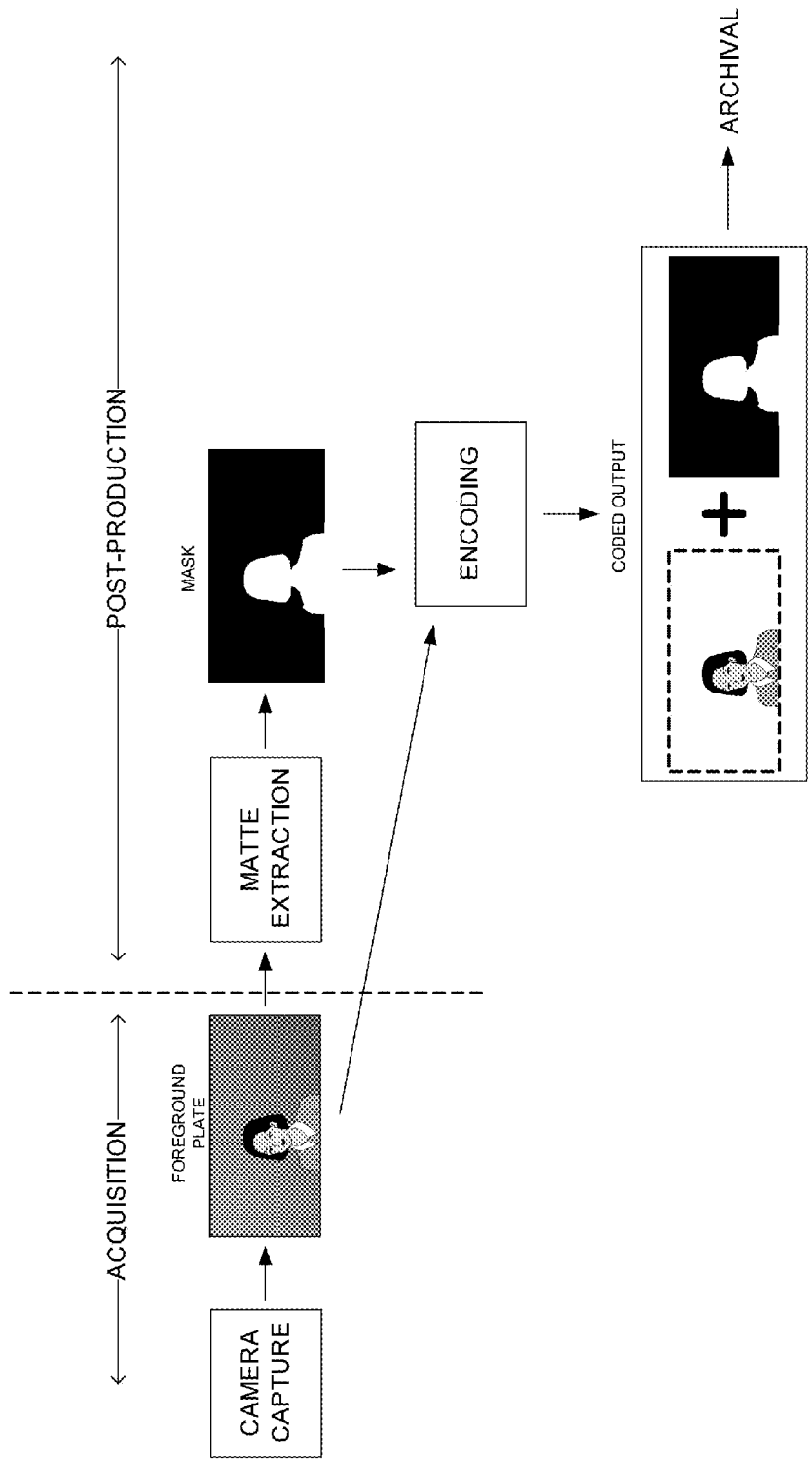
FIG. 6 is a view for explaining image data encoding according to an example embodiment.

FIG. 6 is a view for explaining image data encoding according to an example embodiment in which encoding of image data is performed during post-production by a data processing apparatus that is constructed to execute compositing software, such as, for example, the data processing apparatus of FIG. 4. As shown in FIG. 6, during post-production, foreground image data acquired by a data processing apparatus that is constructed to capture images (e.g., a digital still camera or a digital video camera) is accessed by the data processing apparatus of FIG. 4. The foreground image is in a first representation domain. The data processing apparatus also accesses mask information for pixels of the image data in a first representation domain. In the example embodiment, the foreground image data is RGB image data. The mask information is a binary mask that defines background pixels and foreground pixels separated by an irregular boundary. The binary mask is determined by segmentation of the foreground image data during execution of the compositing software by the data processing apparatus. The data processing apparatus transforms the image data in the first representation domain to a second representation domain, and determines mask information in the second representation domain by using the mask information in the first representation domain. The data processing apparatus masks the image data in the second representation domain by setting image data to zero for background pixels as defined by the determined mask information in the second representation domain. Finally, the data processing apparatus encodes the masked image data in the second representation domain.

In the example embodiment, the encoding includes a data compression. The masked image data in the second representation domain is encoded by an encoding that preserves a nonzero-ness of the data being encoded. The preserving of the nonzero-ness involves preserving a most significant bit of image data for foreground pixels as defined by the determined mask information in the second representation domain.

The encoded masked image data in the second representation domain is outputted from the data processing apparatus. The encoded masked image is composited with other image data during post-production, or used for archival purposes.

In more detail, when used for compositing, the encoded masked image data is decoded, and the mask information in the second representation domain is extracted. The mask information in the first representation domain is recovered from the mask information in the second representation domain. The mask information in the first representation domain comprises matte information, and the decoded masked image data is composited with second image data by application of the matte information.

In an example embodiment, the second representation domain is a sparsifying domain for the class of image data in question. For natural images, a sparsifying domain can be a frequency domain such as one that corresponds to the block discrete cosine transform used in the JPEG compression standard, or a wavelet domain such as one that corresponds to the discrete wavelet transform used in the JPEG 2000 compression standard.

Figure 7:
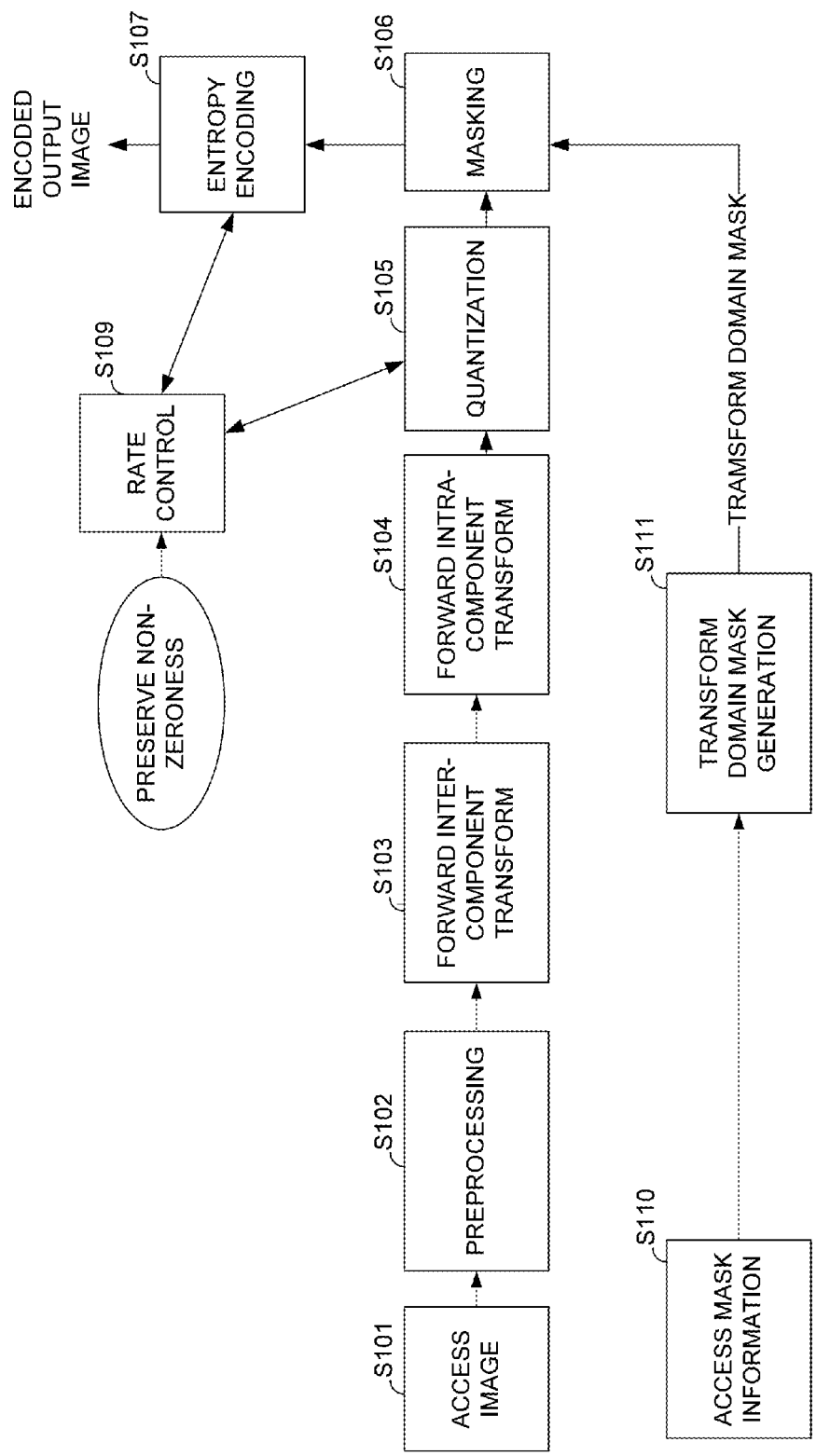
FIG. 7 is a workflow diagram for explaining image data encoding according to an example embodiment.

FIG. 7 is a workflow diagram for explaining image data encoding by the data processing apparatus described with respect to FIG. 6. In the example embodiment, the data processing apparatus is not constructed to capture images, and image data is captured by another data processing apparatus that is constructed to capture images (e.g., a digital still camera or a digital video camera) and functions as an image capture device. In other embodiments, the data processing apparatus is constructed to capture images, and the data processing apparatus captures the image data.

Briefly, according to FIG. 7, foreground image data acquired by the image capture device is accessed by the data processing apparatus (step S101). The foreground image is in a first representation domain. Also accessed is mask information for pixels of the image data in a first representation domain (step S110). The mask information is a binary mask that defines background pixels and foreground pixels separated by an irregular boundary. The binary mask is determined by segmentation of the foreground image data. The image data in the first representation domain is transformed to a second representation domain (steps S102 to S105 and S109), and mask information in the second representation domain is determined by using the mask information in the first representation domain (step S111). The image data in the second representation domain is masked by setting image data to zero for background pixels as defined by the determined mask information in the second representation domain (step S106). The masked image data in the second representation domain is thereafter encoded (steps S107, and S109).

In more detail, in step S101 the data processing apparatus accesses the foreground image data acquired by the image capture device. In the example embodiment, the image data is RGB image data, and the first representation domain is the image domain in the RGB color space. In another embodiment, the image data is raw image data that has been captured by using a color filter array (CFA).

In the preprocessing step S102, the data processing apparatus performs preprocessing. This preprocessing includes, for example, shifting image data values for pixels of the image data to convert unsigned integer values into signed integer values. For example, the integer range 0 . . . 255 (unsigned integers) is converted to the integer range −128 . . . 127 (signed integers). In the forward inter-component transform step S103, the data processing apparatus applies a forward inter-component transform to decorrelate the color components (sometimes also called channels). In the example embodiment, the transform decorrelates luminance and chroma components by converting RGB image data to $YC_bC_r$ image data.

In the forward intra-component transform step S104, the data processing apparatus applies a forward intra-component transform to each component, to transform the image data in the first representation domain to a second representation domain (transform domain). In an example embodiment, the second representation domain is a sparsifying domain for the class of the image data. In the example embodiment, the transform used is the discrete wavelet transform (DWT) used in the JPEG 2000 compression standard, and the sparsifying domain is a wavelet domain. In other embodiments, the transform used is the block discrete cosine transform used in the JPEG compression standard, and the sparsifying domain is a frequency domain. The output of step S104 is a set of coefficients in the second representation domain.

In the quantization step S105, the coefficients are quantized if necessary to reduce the number of bits to represent the coefficients, and thereby reduce data rate. The output of quantization step S105 is a set of integer numbers (quantized coefficients). In rate control step S109, the data processing apparatus sets a quantization level as determined by a specified data rate.

In step S110, the data processing apparatus accesses a binary mask (mask information) for pixels in the image domain. The binary mask defines background pixels and foreground pixels. In the example embodiment, the binary mask defines background pixels and foreground pixels separated by an irregular boundary.

In transform domain mask generation step S111, the data processing apparatus determines a transform domain mask by using the accessed binary mask in the image domain. In this example embodiment, the transform domain mask is determined according to Equation 1:

$$B'[q]=B[p_1] \vee B[p_2] \vee \ldots \vee B[p_n] \quad \text{(Equation 1)}$$

In Equation 1, "$\vee$" is the mathematical symbol for logical disjunction (logical OR), which is also commonly represented by the word "OR". In Equation 1, "q" represents a pixel in the transform domain, "$p_1, p_2, \ldots, p_n$" represent pixels in the image domain whose reconstruction pixel "q" contributes to via an inverse intra-component transform, and $B[p] \in \{1, 0\}$ represents the binary mask in the image domain. Therefore, a pixel "q" in the transform domain is a foreground pixel if $B'[q]=1$, and the pixel "q" is a background pixel if $B'[q]=0$. The inverse intra-component transform is an inverse of the forward intra-component transform of step S104.

In masking step S106, the data processing apparatus masks the quantized coefficients outputted in the quantization step S105.

Figure 8:
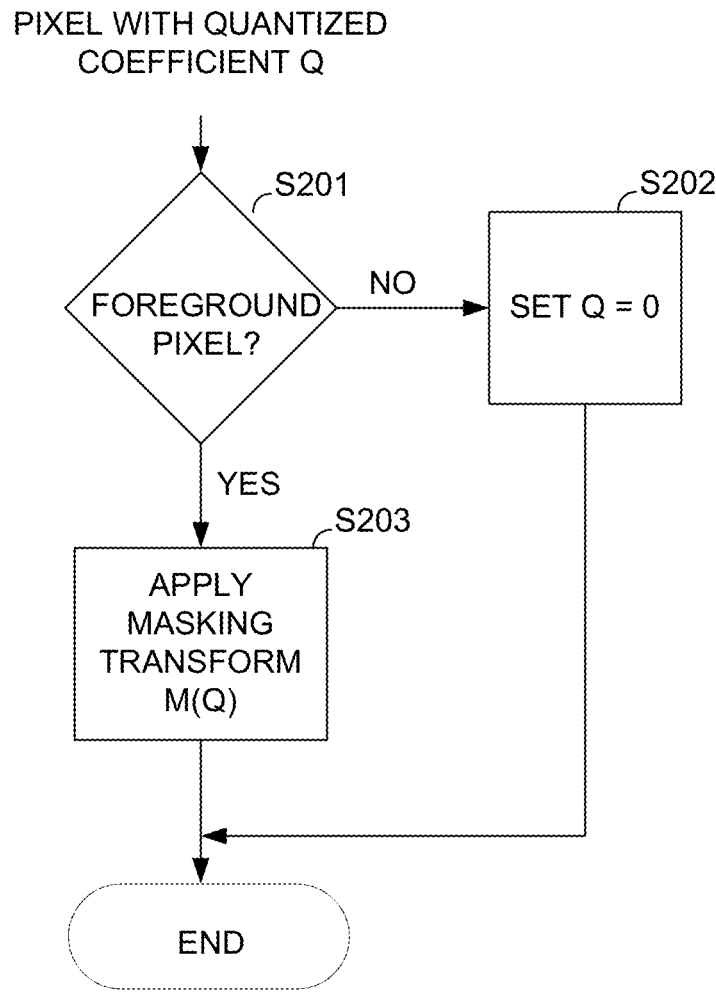
FIG. 8 is a flow diagram for explaining masking image data according to an example embodiment.

FIG. 8 is a flow chart for explaining the masking step S106 in more detail. In step S201, the data processing apparatus determines whether a current pixel q in the transform domain is a foreground pixel by using the transform domain mask. Specifically, the data processing apparatus determines whether $B'[q]=1$ by using Equation 1. If the current pixel is not a foreground pixel ("NO" at step S201), then it is a background pixel, and the data processing apparatus sets the quantized coefficient Q at the pixel to zero at step S202. If the current pixel is a foreground pixel ("YES" at step S201), then the data processing apparatus applies a masking transform M to the quantized coefficient Q (step S203). The masking transform adjusts Q away from zero to a value M(Q). In another embodiment, the masking transform is not applied and step S203 is not executed.

In the entropy encoding step S107, the data processing apparatus encodes the quantized coefficients. The output of step S107 is the encoded masked image data in the second representation domain. In the example embodiment, encoding is not done on the whole image but instead performed on many smaller regions in the second representation domain. These smaller regions are referred to as code blocks. A coding scheme such as EBCOT (Embedded Block Coding with Optimal Truncation) is applied. The data processing apparatus determines the contribution of each code block in the final code stream in rate control step S109.

In the example embodiment, in the rate control step S109, the data processing apparatus does not discard contributions containing a most significant bit (MSB) of any quantized coefficient. As a result of this constraint, a non-zero quantized coefficient will remain non-zero after the encoding, so that a foreground pixel can be distinguished from a background pixel after the encoding.

Figure 9:
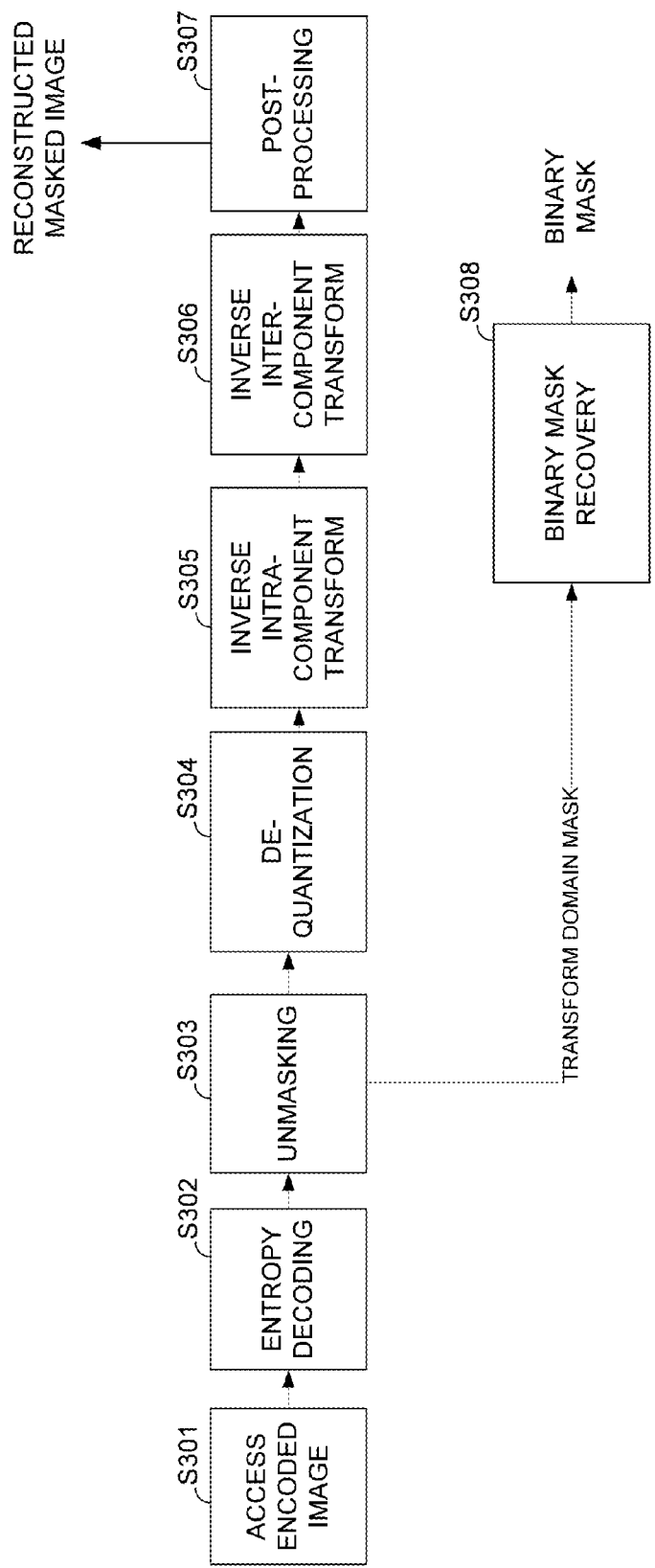
FIG. 9 is a workflow diagram for explaining image data decoding according to an example embodiment.

FIG. 9 is a workflow diagram for explaining image data decoding by a data processing apparatus. Briefly, according to FIG. 9, image data is accessed (step S301), wherein the image data is encoded according to the encoding process of FIG. 7. The image data in the transform domain is decoded (step S302), and the transform domain mask is extracted (step S303). An inverse masking transform is applied to the decoded image data (step S303). The inverse masking transform undoes the adjusting away from zero for foreground pixels as defined by the transform domain mask. The image data in the transform domain is transformed to the image domain to obtain the decoded image data (steps S304 to S307). The mask information in the image domain is recovered from the transform domain mask (step S308).

In more detail, in step S301 the data processing apparatus accesses the encoded image data. In entropy decoding step S302, the data processing apparatus decodes the encoded image to obtain decoded quantized coefficients.

In the unmasking step S303, the data processing apparatus extracts the transform domain mask. More specifically, if the quantized coefficient is Q[q] at location "q", then the value of the binary transform domain mask B'[q] at the corresponding location is given by Equation 2:

$$B'[q]=\text{BOOL}(Q[q] \neq 0) \quad \text{(Equation 2)}$$

In Equation 2, the BOOL operator returns "1" if Q[q] 0 is "TRUE", and it returns "0" if Q[q]≠0 is "FALSE". After the binary transform domain mask is extracted, the data processing apparatus applies an inverse masking transform $M^{-1}$ to the decoded quantized coefficients obtained in step S302.

In step S308, the data processing apparatus recovers the binary mask B[p] (mask information) for pixels in the image domain from the transform domain mask B'[q] extracted in step S303. More specifically, for pixel p in the image domain, if $q_1, q_2, \ldots, q_m$ are the pixels in the transform domain that are required for the reconstruction of p via the inverse intra-component transform, then B[p]=1 if $B'[q_1]=B'[q_2]==B'[q_m]=1$, otherwise B[p]=0.

In dequantization step S304, the data processing apparatus performs dequantization to obtain transform domain coefficients from the unmasked quantized coefficients obtained in step S303.

In inverse intra-component transform step S305, the data processing apparatus applies an inverse intra-component transform to the coefficients obtained in step S304. The inverse intra-component transform is an inverse transform of the forward intra-component transform of step S104. The inverse intra-component transform transforms the transform domain coefficients to image data in the image domain.

In inverse inter-component transform step S306, the data processing applies an inverse inter-component transform to the image data (in the image domain) obtained in step S305. In the example embodiment, the inverse inter-component transform converts $YC_bC_r$ image data to RGB image data.

In postprocessing step S307, the data processing apparatus performs postprocessing. If preprocessing step S102 of FIG. 7 performs a shifting in data range, then the postprocessing step will undo the shifting. For example, the integer range −128 . . . 127 (signed integers) is converted to the integer range 0 . . . 255 (unsigned integers). The output of postprocessing step S307 is the decoded image.

The masking transform M (step S203 of FIG. 8) and the inverse masking transform $M^{-1}$ will now be described in more detail. As described above, the masking transform M adjusts image data away from zero for foreground pixels, and the inverse masking transform $M^{-1}$ undoes the adjusting away from zero for foreground pixels.

In the example embodiment, the masking transform M and the inverse masking transform $M^{-1}$ are defined as follows:

$$M(Q)=\text{sign}(Q)*[|Q|+2^B] \quad \text{(Equation 3)}$$

$$M^{-1}(Q)=\text{sign}(Q)*[|Q|-2^B] \quad \text{(Equation 4)}$$

In Equations 3 and 4, B represents the bit depth used to represent the quantized coefficients, and the nominal dynamic range of the quantized coefficients is $-2^B \leq Q \leq 2^B-1$. The sign( ) operator is defined as follows. If Q<0, sign(Q)=−1, if Q>0, sign(Q)=1, and if Q=0, sign(Q)=1. Thus, the transform M shown in Equation 3 adds an extra MSB (Most Significant Bit) to each quantized coefficient, and this extra MSB corresponds to the transform domain mask. This transform M shown in Equation 3 has the effect of increasing the nominal dynamic range bit count from B to B+1, and this transform is reversible. The inverse masking transform $M^{-1}$ shown in Equation 4 removes the extra MSB and returns each quantized coefficient to its original value.

Figure 10:
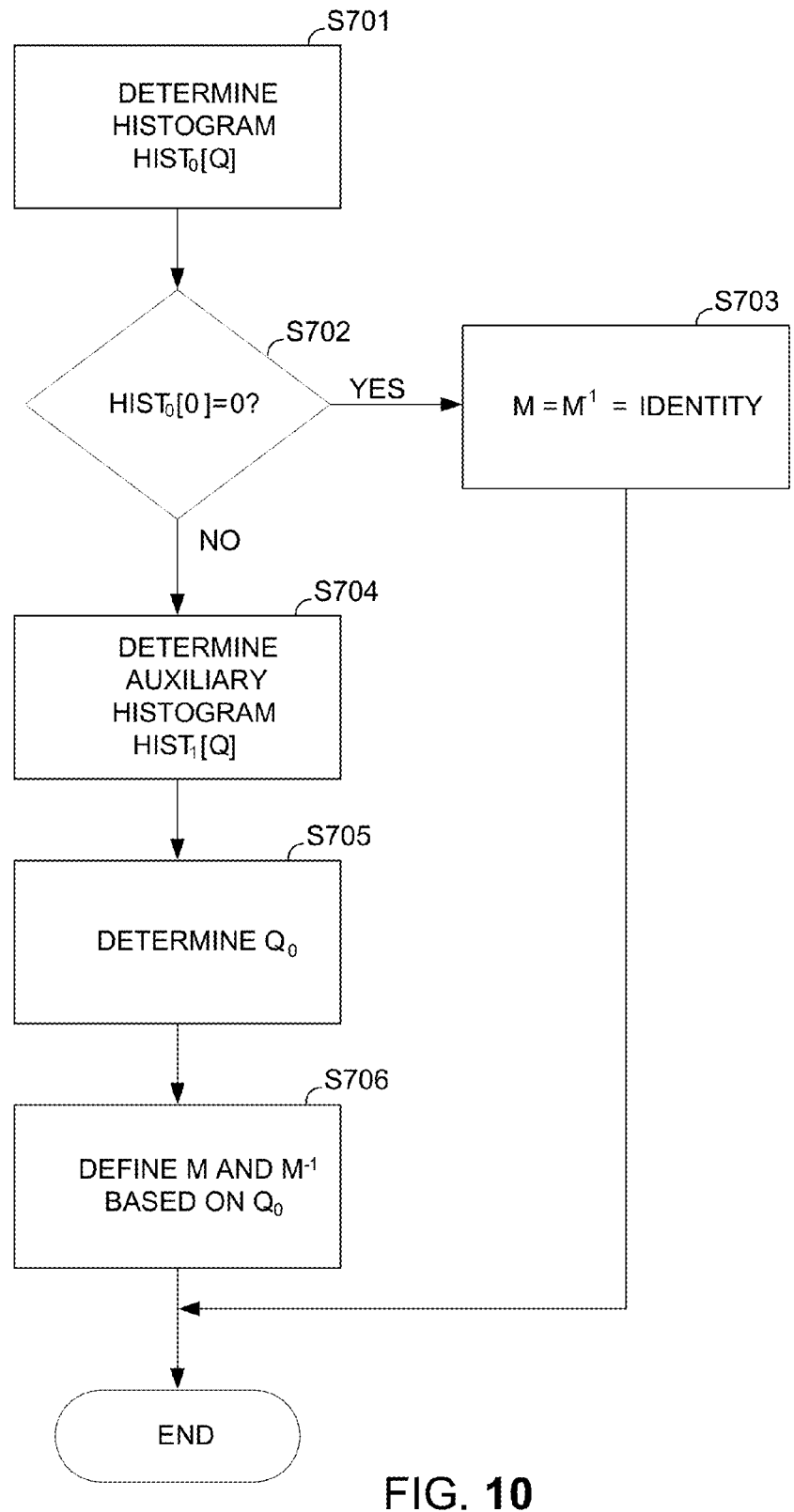
FIG. 10 is a flow diagram for explaining a masking transform according to an example embodiment.

In another example embodiment, the masking transform M is defined so that the masking transform M does not alter the nominal dynamic range, although the masking transform M might not be irreversible. FIG. 10 is a flow diagram for explaining the masking transform M according to this example embodiment in which the masking transform M does not alter the nominal dynamic range of the quantized coefficients.

In step S701, the data processing apparatus constructs a first histogram of the quantized coefficients, wherein $HIST_0[Q]$ counts the occurrence of quantized coefficient Q, $-2^B \leq Q \leq 2^B-1$, in the transform domain image.

In step S702, the data processing apparatus determines whether the value 0 is not assumed by any quantized coefficient (i.e., determines whether $HIST_0[0]=0$). If $HIST_0[0]=0$ ("YES" at step S702), then there is no quantized coefficient that needs to be adjusted away from zero. Therefore, in step S703, the masking transform M and the inverse masking transform $M^{-1}$ are defined such that they do not modify the quantized coefficients (e.g., they are the identity transform).

On the other hand, if $HIST_0[0] \neq 0$ ("NO" at step S702), then at least one quantized coefficient has the value of 0, and therefore there is a need to adjust the quantized coefficients away from zero. Since a transform M that adjusts quantized coefficients away from zero while at the same time maintaining the nominal dynamic range of the quantized coefficients might cause a collision of two distinct values, the transform M is determined such that a collision affects the least number of pixels. To determine such a transform M, a breakpoint $Q_0$ is first determined.

The first step in determining the breakpoint $Q_0$ is to determine an auxiliary histogram $HIST_1[Q]$ (step S704). In step S704, the data processing apparatus determines the auxiliary histogram $HIST_1[Q]$ according to Equation 5, as follows:

$$HIST1[Q] = \begin{cases} HIST0[Q] + HIST0[Q-1] & \text{if } 1 \leq Q \leq 2^B - 1 \\ \text{UNDEFINED} & \text{if } Q = 0 \\ HIST0[Q] + HIST0[Q+1] & \text{if } -2^B \leq Q \leq -1 \end{cases} \quad \text{(Equation 5)}$$

In step S705, the breakpoint $Q_0$ is determined based on the auxiliary histogram $HIST_1[Q]$. In the example embodiment, the breakpoint $Q_0$ is determined according to Equation 6.

$$Q_0 = \text{arg min } HIST_1[Q] \quad \text{(Equation 6)}$$

As shown in Equation 6, $Q_0$ is defined to be the quantized coefficient that has the lowest count in $HIST_1[Q]$. The "arg min" operator returns the argument that gives the minimum value.

In another embodiment, the breakpoint $Q_0$ is required to have a sufficiently high numerical value, as shown in Equation 7:

$$Q_0 = \text{arg min}_{|Q| \geq K} HIST_1[Q] \quad \text{(Equation 7)}$$

In Equation 7, $Q_0$ is required to be at least K, where K is a chosen constant, so that the distortion introduced by the masking transform produces a worst case relative percentage error of 100/K %. For example, K can be $2^{B-1}$. "arg $\min_{|Q| \geq K}$" means taking the argument that gives the minimum value with the additional constraint that $|Q| \geq K$.

After the breakpoint $Q_0$ is determined in step S705, the masking transform M and the inverse masking transform $M^{-1}$ are defined based on the breakpoint $Q_0$ (step S706). If $Q_0 > 0$, then the masking transform M and the inverse masking transform $M^{-1}$ are defined by Equations 8 and 9, respectively:

$$M(Q) = \begin{cases} Q+1 & \text{if } 0 \leq Q \leq Q_0 - 1 \\ Q & \text{otherwise} \end{cases} \quad \text{(Equation 8)}$$

$$M^{-1}(Q) = \begin{cases} Q-1 & \text{if } 1 \leq Q < Q_0 \\ x & \text{if } Q = Q_0 \\ Q & \text{otherwise} \end{cases} \quad \text{(Equation 9)}$$

On the other hand, if $Q_0 < 0$, then the masking transform M and the inverse masking transform $M^{-1}$ are defined by Equations 10 and 11, respectively:

$$M(Q) = \begin{cases} Q-1 & \text{if } Q_0 + 1 \leq Q \leq 0 \\ Q & \text{otherwise} \end{cases} \quad \text{(Equation 10)}$$

$$M^{-1}(Q) = \begin{cases} Q+1 & \text{if } Q_0 \leq Q \leq -1 \\ x & \text{if } Q = Q_0 \\ Q & \text{otherwise} \end{cases} \quad \text{(Equation 11)}$$

In Equations 9 and 11, x is yet undefined. This corresponds to the uncertainty of what $M^{-1}(Q_0)$ should be. From the forward masking transform M, the value of $M^{-1}(Q_0)$ is either $Q_0$ or $[Q_0-\text{sign}(Q_0)*1]$. This uncertainty is caused by the collision of two distinct values, as described above.

In the example embodiment, the value of "x" in Equations 9 and 11, is defined by Equation 12:

$$x = \begin{cases} Q_0 & \text{if } HIST_0[Q_0] \geq HIST_0[Q_0 - \text{sign}(Q_0)*1] \\ Q_0 - \text{sign}(Q_0)*1 & \text{otherwise} \end{cases}$$ (Equation 12)

According to this definition of "x", the masking transform M is reversible if either $HIST_0[Q_0]=0$ or $HIST_0[Q_0-\text{sign}(Q_0)*1]=0$.

In another embodiment, the value "x" in Equations 9 and 11 is defined to be either $Q_0$ or $[Q_0-\text{sign}(Q_0)*1]$ without an analysis of the histogram.

In another example embodiment, the value "x" in Equations 9 and 11 is defined to be a binary random variable with probabilities for $Q_0$ or $[Q_0-\text{sign}(Q_0)*1]$ as defined by Equations 13 and 14, respectively:

$$\text{Probability of } Q_0 = \frac{HIST_0[Q_0]}{HIST_0[Q_0] + HIST_0[Q_0 - \text{sign}(Q_0)*1]}$$ (Equation 13)

$$\text{Probability of } [Q_0 - \text{sign}(Q_0)*1] = \frac{HIST_0[Q_0 - \text{sign}(Q_0)*1]}{HIST_0[Q_0] + HIST_0[Q_0 - \text{sign}(Q_0)*1]}$$ (Equation 14)

The masking step will now be described in more detail. In the example embodiment, the image data is comprised of at least one component. In the masking step (step S106 of FIG. 7), the masking transform is applied to the image data in one component. In other embodiments, the masking transform can be applied to the image data in a component of the at least one component. In the example embodiment, the masking transform is applied to the image data in a component that has a highest resolution. In the example embodiment, in which the data processing apparatus applies the forward inter-component transform to convert the RGB image data to $YC_bC_r$ image data, wherein a chroma subsampling takes place afterwards so that the luminance component has a higher spatial resolution than the chroma components, the masking transform is applied to image data in the luminance component Y of the $YC_bC_r$ image data.

In other example embodiments, the masking transform is applied to the image data in a component in which distortion is least perceptible to the human eye. In such an embodiment, the component corresponds to a chroma component such as the $C_b$ or $C_r$ components in the $YC_bC_r$ color space, or a red component or a blue component in the RGB color space.

Figure 11:
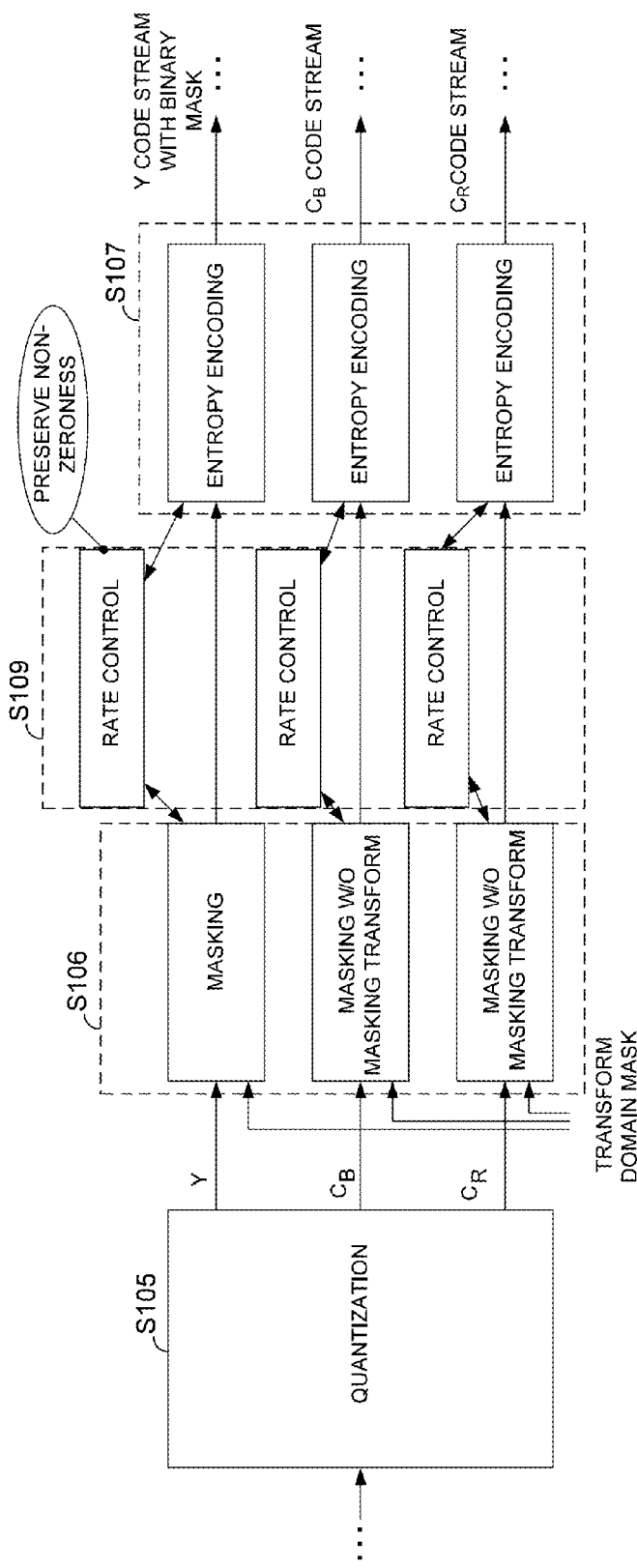
FIG. 11 is a partial workflow diagram for explaining image data encoding in more detail, according to an example embodiment.

FIG. 11 is a partial workflow diagram for explaining image data encoding in which the masking transform is applied to the image data in a component. Steps S105, S106, S107 and S109 of FIG. 11 correspond to steps S105, S106, S107 and S109 of FIG. 7. In step S106, if the current pixel in the transform domain is a background pixel, then the data processing apparatus sets the quantized coefficient to zero. This setting of background pixels to zero is performed for all components of the image data. However, as shown in FIG. 11, the masking transform is only applied to image data in the luminance component Y of the $YC_bC_r$ image data, whereas the masking transform is not applied to the $C_b$ and $C_r$ components of the $YC_bC_r$ image data.

In rate control step S109, for rate control of the luminance component Y of the $YC_bC_r$ image data, the data processing apparatus preserves a most significant bit of the image data. As a result of this constraint, a non-zero quantized coefficient will remain non-zero after the encoding, so that a foreground pixel can be distinguished from a background pixel after the encoding. However, for rate control of the other components, there is not a constraint of preserving a non-zeroness of the image data.

Figure 12:
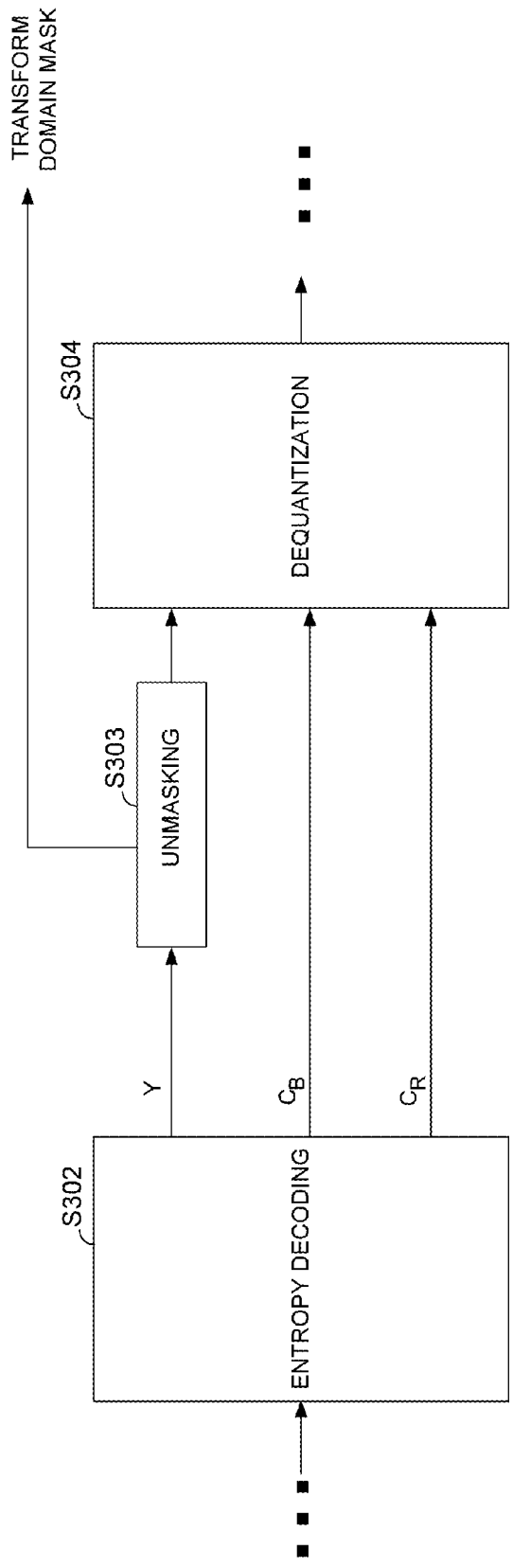
FIG. 12 is a partial workflow diagram for explaining image data decoding in more detail, according to an example embodiment.

FIG. 12 is a partial workflow diagram for explaining image data decoding in which the masking transform is applied to the image data in a component during the encoding. Steps S302, S303 and S304 of FIG. 12 correspond to steps S302, S303 and S304 of FIG. 9. In step S303, the data processing apparatus extracts the transform domain mask from the decoded luminance component Y of the $YC_bC_r$ image data. More specifically, if the quantized coefficient is Q[q] at location "q" for the luminance component Y, then the value of the binary transform domain mask B'[q] at the corresponding location is given by Equation 2, as described above.

Figure 13:
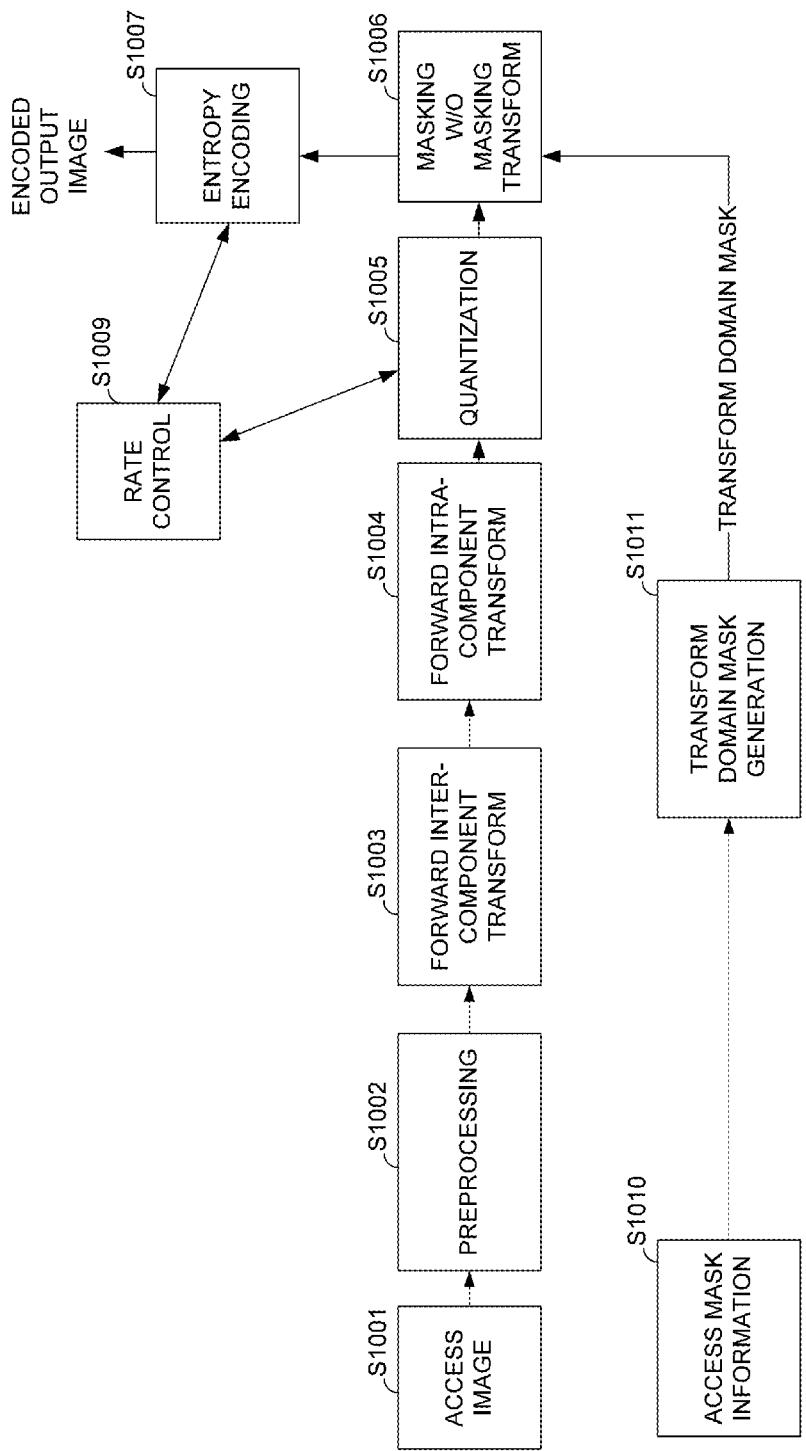
FIG. 13 is a workflow diagram for explaining image data encoding according to an example embodiment.

FIG. 13 is a workflow diagram for explaining image data encoding in accordance with an example embodiment in which the masking transform is not applied to the image data. Steps S1001, S1002, S1003, S1004, S1005, S1006, S1007, S1009, S1010 and S1011 of FIG. 13 generally correspond to steps S101, S102, S103, S104, S105, S106, S107, S109, S110 and S111 of FIG. 7. In step S1006, if the current pixel in the transform domain is a background pixel, then the data processing apparatus sets the quantized coefficient to zero. This setting of background pixels to zero is performed for all components of the image data. However, the masking transform is not applied to the image data. Also, in rate control step S1009, rate control is performed without the constraint of preserving a non-zeroness of the image data.

Figure 14:
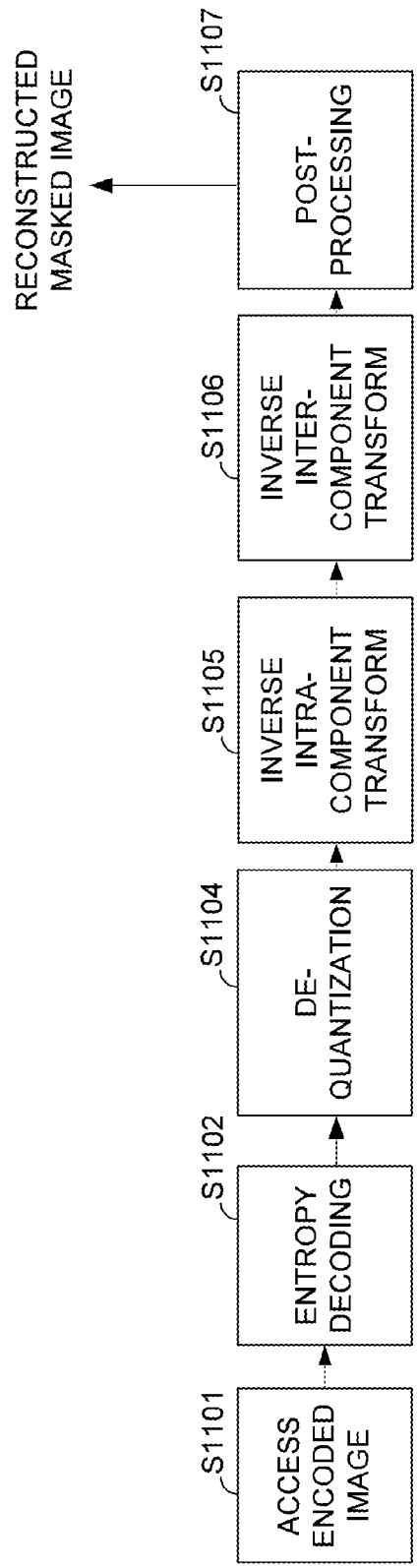
FIG. 14 is a workflow diagram for explaining image data decoding according to an example embodiment.

FIG. 14 is a workflow diagram for explaining image data decoding in accordance with an example embodiment in which the masking transform is not applied to the image data. Steps S1101, S1102, S1104, S1005, S1006, and S1007 of FIG. 14 generally correspond to steps S301, S302, S304, S305, S306, and S307 of FIG. 9. As shown in FIG. 14, the data processing apparatus does not extract the transform domain mask from the encoded image data, and does not recover the binary mask from the extracted transform domain mask.

According to other embodiments contemplated by the present disclosure, example embodiments may include a computer processor such as a single core or multi-core central processing unit (CPU) or micro-processing unit (MPU), which is constructed to realize the functionality described above. The computer processor might be incorporated in a stand-alone apparatus or in a multi-component apparatus, or might comprise multiple computer processors which are constructed to work together to realize such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. For these purposes, access to the non-transitory computer-readable storage medium may be a local access such as by access via a local memory bus structure, or may be a remote access such as by access via a wired or wireless network or Internet. The computer processor(s) may thereafter be operated to execute the computer-executable program or program steps to perform functions of the above-described embodiments.

According to still further embodiments contemplated by the present disclosure, example embodiments may include methods in which the functionality described above is performed by a computer processor such as a single core or multi-core central processing unit (CPU) or micro-processing unit (MPU). As explained above, the computer processor might be incorporated in a stand-alone apparatus or in a multi-component apparatus, or might comprise multiple computer processors which work together to perform such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. Access to the non-transitory computer-readable storage medium may form part of the method of the embodiment. For these purposes, access to the non-transitory computer-readable storage medium may be a local access such as by access via a local memory bus structure, or may be a remote access such as by access via a wired or wireless network or Internet. The computer processor(s) is/are thereafter operated to execute the computer-executable program or program steps to perform functions of the above-described embodiments.

The non-transitory computer-readable storage medium on which a computer-executable program or program steps are stored may be any of a wide variety of tangible storage devices which are constructed to retrievably store data, including, for example, any of a flexible disk (floppy disk), a hard disk, an optical disk, a magneto-optical disk, a compact disc (CD), a digital versatile disc (DVD), micro-drive, a read only memory (ROM), random access memory (RAM), erasable programmable read only memory (EPROM), electrically erasable programmable read only memory (EEPROM), dynamic random access memory (DRAM), video RAM (VRAM), a magnetic tape or card, optical card, nanosystem, molecular memory integrated circuit, redundant array of independent disks (RAID), a nonvolatile memory card, a flash memory device, a storage of distributed computing systems and the like. The storage medium may be a function expansion unit removably inserted in and/or remotely accessed by the apparatus or system for use with the computer processor(s).

This disclosure has provided a detailed description with respect to particular representative embodiments. It is understood that the scope of the appended claims is not limited to the above-described embodiments and that various changes and modifications may be made without departing from the scope of the claims.

What is claimed is:

1. An image data encoding method comprising:
accessing image data and mask information for pixels of the image data in a first representation domain, wherein the mask information defines background pixels and foreground pixels;
transforming the image data in the first representation domain to a second representation domain;
determining mask information in the second representation domain by using the mask information in the first representation domain;
masking the image data in the second representation domain by setting image data to a value of zero for background pixels as defined by the determined mask information in the second representation domain, wherein the image data is comprised of at least one component, and wherein in masking the image data, a masking transform is applied to the image data in a component following the setting-to-zero step, wherein the masking transform adjusts image data away from a value of zero for foreground pixels as defined by the determined mask information in the second representation domain; and
encoding the masked image data in the second representation domain.

2. The image data encoding method according to claim 1, wherein the mask information defines foreground and background pixels separated by an irregular boundary.

3. The image data encoding method according to claim 1, wherein the mask information is comprised of a binary mask.

4. The image data encoding method according to claim 1, wherein the component of the image data is a component that has a highest resolution.

5. The image data encoding method according to claim 4, wherein the component corresponds to a luminance component.

6. The image data encoding method according to claim 1, wherein the component of the image data is a component in which distortion is least perceptible to the human eye.

7. The image data encoding method according to claim 6, wherein the component corresponds to a chroma component, a red component or a blue component.

8. The image data encoding method according to claim 1, wherein the encoding includes a data compression.

9. The image data encoding method according to claim 1, wherein the masked image data in the second representation domain is encoded by an encoding that preserves a nonzero-ness of the data being encoded.

10. The image data encoding method of claim 9, wherein preserving nonzero-ness corresponds to preserving a most significant bit of image data for foreground pixels as defined by the determined mask information in the second representation domain.

11. A method of decoding encoded image data comprising:
accessing masked image data encoded according to the method of claim 1;
decoding the masked image data in the second representation domain; and
transforming the masked image data in the second representation domain to the first representation domain to obtain the decoded image data.

12. A method of decoding encoded image data comprising:
accessing image data encoded according to the method of claim 1;
decoding the image data in the second representation domain;
extracting the mask information in the second representation domain;
applying an inverse masking transform to the image data in the second representation domain, wherein the inverse masking transform undoes the adjusting away from zero for foreground pixels as defined by the mask information in the second representation domain;

transforming the image data in the second representation domain to the first representation domain to obtain the decoded image data; and recovering the mask information in the first representation domain from the mask information in the second representation domain.

13. The method according to claim 12, wherein the mask information in the first representation domain comprises matte information, and further comprising compositing of the decoded image data with second image data by application of the matte information.

14. The image data encoding method according to claim 1, wherein the first representation domain is a spatial domain and the second representation domain is a frequency domain.

15. The image data encoding method according to claim 1, further comprising identification of background pixels in the image data in the second representation domain by using definitions of background pixels in the determined mask information in the second presentation domain, wherein masking of image data in the second representation domain comprises setting of image data for the identified background pixels to zero.

16. The image data encoding method according to claim 1, wherein the masking transform adjusts image data away from a value of zero for foreground pixels, even if the foreground pixels themselves have a value of zero.

17. An image data decoding apparatus comprising:
at least one processor configured to:
masked image data encoded according to the method of claim 1;
decode the masked image data in the second representation domain; and
transform the masked image data in the second representation domain to the first representation domain to obtain the decoded image data.

18. An image data decoding apparatus comprising:
at least one processor configured to:
image data encoded according to the method of claim 1;
decode the image data in the second representation domain;
extract the mask information in the second representation domain;
apply an inverse masking transform to the image data in the second representation domain, wherein the inverse masking transform undoes the adjusting away from zero for foreground pixels as defined by the mask information in the second representation domain;
transform the image data in the second representation domain to the first representation domain to obtain the decoded image data; and
recover the mask information in the first representation domain from the mask information in the second representation domain.

19. The image data decoding apparatus according to claim 18, wherein the mask information in the first representation domain comprises matte information, and wherein the decoded image data is composited with second image data by application of the matte information.

20. An image data encoding apparatus comprising:
at least one processor configured to:
access image data and mask information for pixels of the image data in a first representation domain, wherein the mask information defines background pixels and foreground pixels;
transform the image data in the first representation domain to a second representation domain;
determine mask information in the second representation domain by using the mask information in the first representation domain;
mask the image data in the second representation domain by setting image data to a value of zero for background pixels as defined by the determined mask information in the second representation domain, wherein the image data is comprised of at least one component, and wherein in masking the image data, a masking transform is applied to the image data in a component following the setting-to-zero step, wherein the masking transform adjusts image data away from a value of zero for foreground pixels as defined by the determined mask information in the second representation domain; and
encode the masked image data in the second representation domain.

21. The image data encoding apparatus according to claim 20, wherein the mask information defines foreground and background pixels separated by an irregular boundary.

22. The image data encoding apparatus according to claim 20, wherein the mask information is comprised of a binary mask.

23. The image data encoding apparatus according to claim 20, wherein the component of the image data is a component that has a highest resolution.

24. The image data encoding apparatus according to claim 23, wherein the component corresponds to a luminance component.

25. The image data encoding apparatus according to claim 20, wherein the component of the image data is a component in which distortion is least perceptible to the human eye.

26. The image data encoding apparatus according to claim 25, wherein the component corresponds to a chroma component, a red component or a blue component.

27. The image data encoding apparatus according to claim 20, wherein the encoding includes a data compression.

28. The image data encoding apparatus according to claim 20, wherein the masked image data in the second representation domain is encoded by an encoding that preserves a non-zero-ness of the data being encoded.

29. The image data encoding apparatus claim 28, wherein preserving nonzero-ness corresponds to preserving a most significant bit of image data for foreground pixels as defined by the determined mask information in the second representation domain.

30. The image data encoding apparatus according to claim 20, wherein the first representation domain is a spatial domain and the second representation domain is a frequency domain.

31. The image data encoding apparatus according to claim 20, further comprising identification of background pixels in the image data in the second representation domain by using definitions of background pixels in the determined mask information in the second presentation domain, wherein masking of image data in the second representation domain comprises setting of image data for the identified background pixels to zero.

32. The image data encoding apparatus according to claim 20, wherein the masking transform adjusts image data away from a value of zero for foreground pixels, even if the foreground pixels themselves have a value of zero.

33. A computer-executable module stored on a non-transitory computer-readable storage medium, the module being for an image data encoding apparatus, the module comprising:
an accessing module for accessing image data and mask information for pixels of the image data in a first representation domain, wherein the mask information defines background pixels and foreground pixels;

a transforming module for transforming the image data in the first representation domain to a second representation domain;

a determining module for determining mask information in the second representation domain by using the mask information in the first representation domain;

a masking module for masking the image data in the second representation domain by setting image data to a value of zero for background pixels as defined by the determined mask information in the second representation domain, wherein the image data is comprised of at least one component, and wherein in masking the image data, a masking transform is applied to the image data in a component following the setting-to-zero step, wherein the masking transform adjusts image data away from a value of zero for foreground pixels as defined by the determined mask information in the second representation domain; and an encoding module for encoding the masked image data in the second representation domain.

34. A non-transitory computer-readable storage medium retrievably storing computer-executable process steps for performing an image data encoding method, the method comprising:

accessing image data and mask information for pixels of the image data in a first representation domain, wherein the mask information defines background pixels and foreground pixels;

transforming the image data in the first representation domain to a second representation domain;

determining mask information in the second representation domain by using the mask information in the first representation domain;

masking the image data in the second representation domain by setting image data to a value of zero for background pixels as defined by the determined mask information in the second representation domain, wherein the image data is comprised of at least one component, and wherein in masking the image data, a masking transform is applied to the image data in a component following the setting-to-zero step, wherein the masking transform adjusts image data away from a value of zero for foreground pixels as defined by the determined mask information in the second representation domain; and encoding the masked image data in the second representation domain.

* * * * *